United States Patent [19]
Clark

[11] Patent Number: 6,041,152
[45] Date of Patent: Mar. 21, 2000

[54] MULTI-CHANNEL FIBER OPTIC COMMUNICATIONS SYSTEM AND MULTIPLEXER/DEMULTIPLEXER ARRANGEMENT THEREFOR

[75] Inventor: Timothy Edward Clark, Lisle, Ill.

[73] Assignee: Amphenol Corporation, Wallingford, Conn.

[21] Appl. No.: 08/921,797

[22] Filed: Sep. 2, 1997

[51] Int. Cl.[7] .................................. G02B 6/28; H04J 14/02
[52] U.S. Cl. .................................. 385/24; 385/15; 385/16; 385/37; 385/39; 385/42; 359/115; 359/124; 359/127; 359/130
[58] Field of Search .................................. 385/15, 16, 17, 385/24, 37, 39, 42; 359/115, 124, 127, 130

[56] References Cited

U.S. PATENT DOCUMENTS

| | | | |
|---|---|---|---|
| 5,283,686 | 2/1994 | Huber | 359/337 |
| 5,448,390 | 9/1995 | Tsuchiya et al. | 359/132 |
| 5,448,660 | 9/1995 | Calvani et al. | 385/21 |
| 5,488,500 | 1/1996 | Glance | 359/127 |
| 5,555,118 | 9/1996 | Huber | 359/125 |
| 5,557,439 | 9/1996 | Alexander et al. | 359/130 |
| 5,572,357 | 11/1996 | Nakazato et al. | 359/341 |
| 5,574,584 | 11/1996 | Darcie et al. | 359/125 |
| 5,579,143 | 11/1996 | Huber | 359/130 |
| 5,596,667 | 1/1997 | Watanabe | 385/122 |
| 5,608,571 | 3/1997 | Epworth et al. | 359/341 |
| 5,608,825 | 3/1997 | Ito | 385/24 |
| 5,742,416 | 4/1998 | Mizrahi | 359/143 |
| 5,751,456 | 5/1998 | Koonen | 359/127 |
| 5,761,351 | 6/1998 | Johnson | 385/15 |
| 5,793,908 | 8/1998 | Mizuochi et al. | 385/24 |
| 5,809,190 | 9/1998 | Chen | 385/43 |
| 5,822,095 | 10/1998 | Taga et al. | 359/127 |
| 5,850,301 | 12/1998 | Mizuochi et al. | 359/124 |
| 5,861,967 | 1/1999 | Mizuochi et al. | 359/130 |
| 5,887,091 | 3/1999 | Jabr et al. | 385/24 |

OTHER PUBLICATIONS

Jay S. Van Delden, Optical Circulators Improve Bidirectional Fiber Systems, "Laser Focus World", Nov. 1995, pp. 109–112.

*Primary Examiner*—Brian Healy
*Attorney, Agent, or Firm*—Bacon & Thomas

[57] ABSTRACT

In a fiber optic communications system in which channel insertion and removal is carried out by a plurality of modular cascaded multiplexer and demultiplexer components, the respective common outputs and inputs of the multiplexer and demultiplexer components are connected to bi-directional or uni-directional combiners arranged to combine or separate groups of channels for transmission over a single fiber transmission cable. The combiners each include one or more optical circulators.

19 Claims, 7 Drawing Sheets

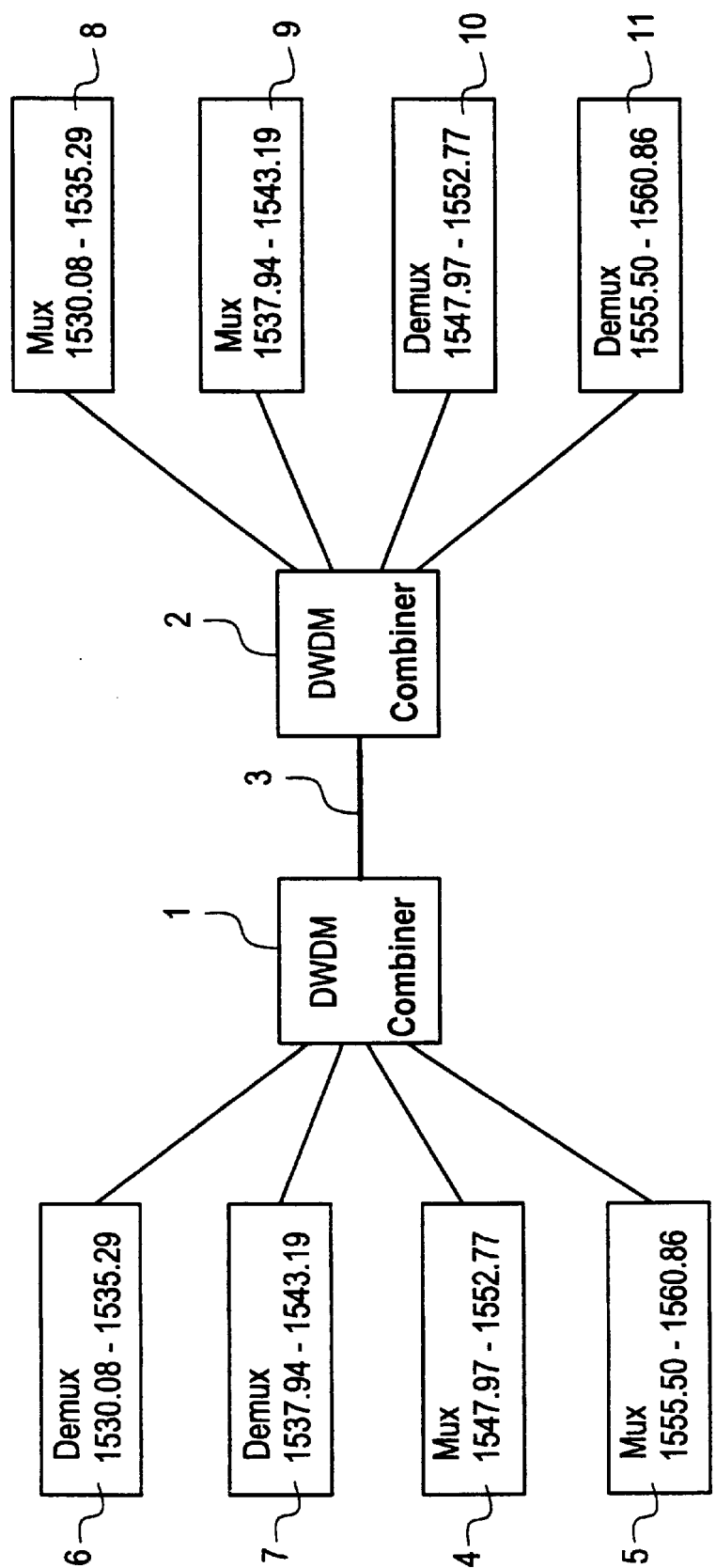

Demultiplexer

Multiplexer

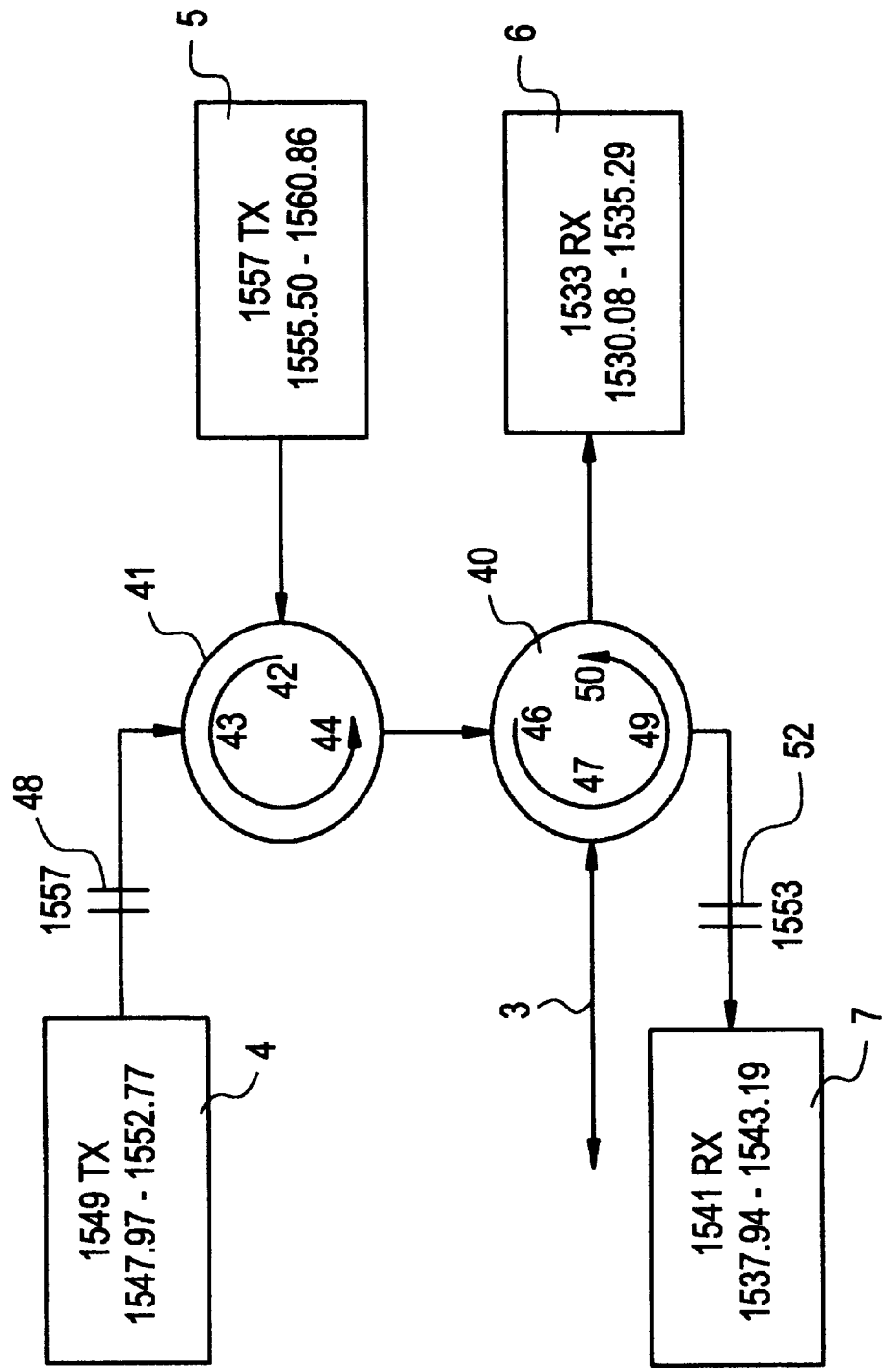

MULTI-CHANNEL FIBER OPTIC COMMUNICATIONS SYSTEM AND MULTIPLEXER/DEMULTIPLEXER ARRANGEMENT THEREFOR

BACKGROUND OF THE INVENTION

1. Field of the Invention

This invention relates to a multiple channel fiber optic communications system, and in particular to a multitier wavelength division multiplexing arrangement therefor.

2. Discussion of Related Art

Fiber optic systems are presently being used for high bandwidth, high speed voice and video communications. Originally, single channel systems in which each fiber carried a single channel sufficed, but increases in traffic have led to a need for greater channel-carrying capacity. Because of the high cost of laying optical fibers, increasing capacity by laying more fibers is impractical, and thus achieving greater efficiency in utilizing fiber resources has become increasingly important, which has led to the development of systems for adding channels to existing fibers.

The most practical method of carrying multiple channels over a single fiber is to create channels having different non-interfering wavelengths. The different wavelength carriers are coupled to the single fiber using a technique known as wavelength division multiplexing and separated at the receiving side by demultiplexing the signals. While such techniques have greatly increased the capacity of existing fiber optic systems, the traffic demands on such systems have risen even faster, resulting in the need to further increase the number of channels which can be carried.

Since the total bandwidth of the signals which can be carried by an optical fiber is limited, adding channels to existing fibers involves increasing the channel density and decreasing the channel separation. The smaller the channel separation, however, the more difficult it is to isolate the channels, and to separate them without significant losses. Nevertheless, current technologies are capable of providing for two-way communications over channels separated by less than one nanometer, using a technique known as dense wavelength division multiplexing (DWDW).

Copending U.S. patent application Ser. No. 08/921,330, filed Aug. 29, 1997, pending, describes a variety of components suitable for use in DWDM systems, based on the principle of using Mach-Zehnder interferometric filters having in-fiber Bragg gratings to insert and remove individual channels from a multiplexed signal. The multiplexed interferometric filters are arranged in serial or cascaded fashion and packaged in modular components having four or eight filters each.

While the number of filters in a component is theoretically unlimited, however, and any number of components can be cascaded together, in practice the number of filters that can be connected together in this fashion is limited by the additive effect of the losses due to the individual Bragg gratings through which a signal must pass after insertion and prior to separation.

An alternative fiber optic wave division multiplexing technique is to use multiple port optical circulators having in-fiber Bragg gratings at the single channel input and output ports to insert and remove individual channels from the multiplexed signal. Optical circulators are commercially available items and their use at least in demultiplexers is described in U.S. Pat. No. 5,608,825. However, for many applications, Mach-Zehnder couplers of the type described in the above-cited copending application are preferred to optical circulators.

The present invention addresses the problem of limitations as to the number of individual filter units that can conveniently be cascaded without unacceptable losses by proposing to use optical circulators as combiners, also known as collectors, for the cascaded individual channel multiplexing and demultiplexing components described in the copending patent application. Because of the their modularity, the components can easily be added to a suitably arranged combiner, thereby obtaining the advantages of superior channel isolation while adding a degree of parallelism in order to limit losses as the number of channels is increased.

This use of combiners is similar to the proposal made in the copending application to existing narrowband wavelength division multiplexing (NWDM) components as combiners for the outputs of the individual cascaded multiplexer components, and may be considered an extension of the concept, but the use of optical circulators as combiners has the advantage of providing a greater passband for the combined channels, allowing the entire bandwidth of the individual cascaded multiplexer components to be utilized.

Thus, although optical circulators and Bragg gratings are well-known technologies, as is their combination in WDM devices, their use as combiners in combination with cascaded or serial individual channel separating arrangements is both novel and provides advantages unattainable using current optical circulator arrangements.

SUMMARY OF THE INVENTION

It is accordingly an objective of the invention to provide a fiber optic communications system in which cascaded wave division multiplexing arrangements are used to provide low loss/high isolation channel separation, and optical filters having sufficiently wide channel passbands are used to connect individual cascaded multiplexer units in parallel in order to further increase the number of channels while providing optimal control of loss budgets.

It is a further objective of the invention to provide a wave division multiplexing arrangement for use in such a system, in which serial or cascaded multiplexer and demultiplexer components are connected in parallel to optical circulator combiners in order to obtain the advantages of low loss and high isolation channel separation provided by the individual multiplexer and demultiplexer components, without the limitations as to the number of channels which can be added using purely serial arrangements.

It is yet another objective of the invention to provide an improved combiner for use in such arrangements, made up of multiport optical circulators arranged to combine groups of wavelengths at DWDM channel separations, in both bi-directional and uni-direction configurations, using serially arranged Bragg gratings at the ports in order to separate the groups of channels.

These objectives of the invention are accomplished in a preferred embodiment of the invention by providing a fiber optic communications system in which channel insertion and removal is carried out by a plurality of modular cascaded multiplexer and demultiplexer components, preferably but not necessarily of the type described in the above cited copending U.S. patent application Ser. No. 08/921,330, and in which the respective common outputs and inputs of the multiplexer and demultiplexer components are connected to multiport optical circulator bi-directional or uni-directional combiners arranged to combine or separate groups of channels for transmission over a single fiber transmission cable.

In one exemplary embodiment of the invention, the communication system is a bi-directional communication system having 16 channels, the individual multiplexers and demultiplexers are four channel components, two of which are provided at each end of the transmission line, and the combiners are either made up of a pair of individual circulators having three and four ports, respectively, or a single five port circulator. According to another exemplary embodiment of the invention, the same circulator arrangement is used to provide uni-directional 16 multiplexer and demultiplexer components. It will of course be appreciated by those skilled in the art that the principles of these exemplary embodiments may be extending to bi-directional and uni-directional arrangements having different number of channels, both with respect to the overall system and the individual components.

BRIEF DESCRIPTION OF THE DRAWINGS

FIG. 1 is a functional block diagram of a bi-directional 16 channel communications system constructed in accordance with the principles of a preferred embodiment of the invention.

FIG. 3A is a schematic diagram of a bi-directional combiner suitable for use in the communications system of FIG. 1.

DETAILED DESCRIPTION OF THE PREFERRED EMBODIMENTS

Figure 2A:
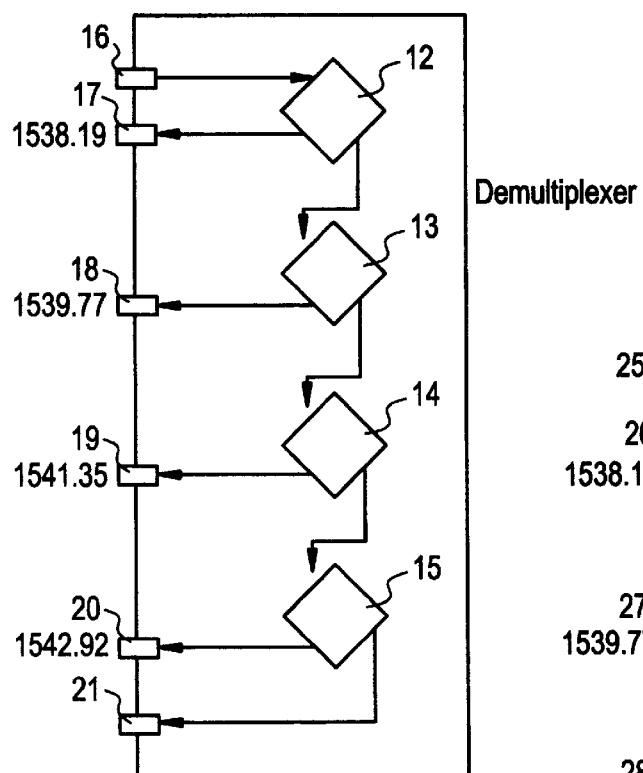
FIG. 2A is a schematic diagram of a four channel demultiplexer for use in the communications system of FIG. 1

The basic architecture of the WDM system of the first preferred embodiment of the invention is illustrated in FIG. 1. It includes a pair of bi-directional combiners 1 and 2 at opposite ends of a multi-channel fiber optic transmission line 3. The combiners perform channel combining or multiplexing functions and channel separation or demultiplexing functions so as to serve as an interface between the transmission line 3 and a plurality of multiplexers and demultiplexers which combine individual channel signal sources for transmission and separate multiplexed signals for distribution to individual receivers or signal processors.

In particular, combiner 1 is connected to first and second multiplexers 4 and 5 and to first and second demultiplexers 6 and 7. While the illustrated channel wavelengths are exemplary in nature and not intended to be limiting, multiplexers 4 and 5 respectively combine wavelengths of 1547.97 to 1552.77 nm and 1555.50 to 1560.86 nm, and demultiplexers 6 and 7 respectively separate wavelengths of 1530.08 to 1535.29 nm and 1537.94 to 1543.19 nm. Combiner 2, on the other hand, is connected to multiplexers 8 and 9 which multiplex the wavelengths separated by demultiplexers 6 and 7, respectively, and demultiplexers 10 and 11 separate the wavelengths multiplexed by multiplexers 4 and 5.

By using combiners to combine the individual multiplexer and demultiplexer components, the overall insertion loss of the illustrated system is limited to that of the individual multiplexer and demultiplexer components, plus that contributed by the combiners. For the preferred four channel components described in the copending application cited above, which have an insertion loss of 1.6 dB for the multiplexer and 1.9 dB for the demultiplexer, if the insertion loss of the combiners is 2.0 dB, as is possible with the two circulator combiner described below, then the total insertion loss is 7.5 dB. With a combiner insertion loss of 1.0, as is possible with the one circulator combiner described below, the total insertion loss drops to 5.5 dB.

Although described in detail in the copending application, the essential details of the basic cascaded four channel components used the preferred embodiment will now be described in connection with FIGS. 2A and 2B. The demultiplexer illustrated in FIG. 2A corresponds to demultiplexers 6, 7, 10, and 11 of FIG. 1, while the demultiplexer illustrated in FIG. 2B corresponds to multiplexers 4, 5, 8, and 9. Although these demultiplexer and multiplexer components are especially preferred, however, the invention is not necessarily limited to the particular arrangements shown, nor is the invention limited to four channel multiplexers, it being possible to serially connect a pair of two channel multiplexers to form a four channel multiplexer, to replace components 4–11 with components each having a number of channels greater than four (with appropriate modifications to the combiners), or to include more or less than four components on each side of the transmission line.

As illustrated in FIG. 2A, demultiplexers 4, 5, 8, and 9 are each made up of four Mach-Zehnder interferometric couplers 12–15, a common input 16, four single channel outputs 17–20, and an optional auxiliary output 21. The common input 16 is connected to one of the combiners 1 and 2, while the four single channel outputs are connected to signal receiving and processing circuitry. Preferably, the common input and each of the outputs is connectorized to facilitate installation, using standard connectors such as FC connectors, while internal connections to the interferometric couplers 12–15 are by means of fusion splices or similar low loss connections. Additional isolation of the single channel outputs may be achieved by adding Bragg gratings or other types of filters, such as thin film optical filters, or additional interferometric couplers.

Multiplexers 4, 5, 8, and 9, on the other hand, preferably use only three interferometric couplers 22–24, but are otherwise similar in construction to demultiplexers 6 7, 10, and 11 including common input 25 and single channel inputs 26–29. The fourth interferometric coupler can be omitted from the multiplexer because adequate channel isolation is provided by the Bragg gratings used internally by the couplers, as explained in the copending application, although additional gratings, filters, or couplers can be added if further isolation is required.

The individual channel wavelengths in the illustrated examples are the center wavelengths for demultiplexer 7 and multiplexer 9, but the remaining demultiplexers and multiplexers are otherwise identical to these components and can easily be tuned to the appropriate wavelengths by selection of the in-fiber Bragg gratings used in the individual interferometer units. The units are commercially available, and further details are disclosed in U.S. Pat. No. 4,900,119, incorporated herein by reference. For purposes of this application, it is sufficient to note that the interferometer units in question each includes, as shown in FIG. 2C, two 50/50 fiber optic couplers 30 and 31 connected by two identical Bragg gratings 32 and 33. The first coupler has two ports 34 and 35, and the second coupler includes two ports 36 and 37, ports 34–37 being in the form of fiber ends which can be connected by fusion splicing or any other convenient means to a fiber optic connector, or to the port of an additional interferometer unit.

When used for the purpose of removing a channel from a wavelength division multiplexed signal, the first port of the Mach-Zehnder interferometer illustrated in FIG. 2C, port 34, serves as the input for the multiplexed signal from which the channel is to be removed, the input signal being equally split by the 50/50 coupler 30 and transmitted to the two identical Bragg gratings 32 and 33, which are arranged to reflect only the channel (or channels) to be removed, and to pass all other channels with minimal loss.

The reflected channel or wavelength is then combined by the first 50/50 coupler 30 and output through the second port, port 35, while the channels which pass through the Bragg filters are combined by the second 50/50 coupler 31 and output through the fourth port, port 37. The third port, port 36, is terminated by conventional means and is generally not used, although it is possible to use port 36 to add back a signal at the same wavelength as the signal originally reflected by the Bragg grating and output through port 35 in order to form an add/drop unit, as described in the above-cited copending application.

When the illustrated Mach-Zehnder interferometer is used for the purpose of inserting a wavelength into a wavelength division multiplexed signal, the fourth port (port 37) is used as the input for the signal to which a channel is to be added, and the second port (port 35) is connected to the channel source, with Bragg gratings 33 and 34 again being arranged to reflect the channel being inserted and to pass other channels. In this case, 50/50 coupler 31 separates the signal input through port 37 into two equal parts which pass through filters 32 and 33 and are combined by 50/50 coupler 30 for output through port 34. The inserted channel is separated into two parts by 50/50 coupler 30, reflected by filters 32 and 33, and then re-combined in 50/50 coupler 30 for output through the first port (port 34) along with the signal originally input through port 37.

As a result, the demultiplexer illustrated in FIG. 2A, which uses four of the above-described Mach-Zehnder interferometric couplers operates as follows: The four input wavelengths 1538.19 nm, 1539.77 nm, 1541.35 nm, and 1542.92 nm are input through common input connector 16 of the component, and the latter three wavelengths pass through the Bragg gratings of Mach-Zehnder interferometer 12 (gratings 32 and 33 shown in FIG. 2C), while the 1538.19 nm wavelength is reflected back by the Bragg gratings and output through connector 17 to a suitable receiving device. The longest two of the three remaining wavelengths then pass through the Bragg gratings of Mach-Zehnder interferometer 13, while the 1539.77 nm wavelength is reflected back and output through connector 18, with the longest remaining wavelength passing through the Bragg gratings of Mach-Zehnder interferometer 14, and the 1541.35 wavelength being reflected back to be output through connector 195. The last input wavelength of 1542.92 is then reflected back by the Bragg gratings of Mach-Zehnder interferometer 15 and output through connector 20.

Figure 2B:
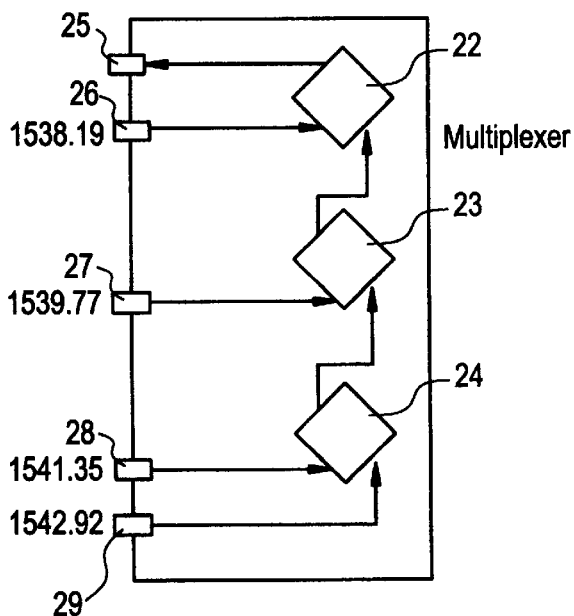
FIG. 2B is a schematic diagram of a four channel multiplexer for use in the communications system of FIG. 1.
Figure 2C:
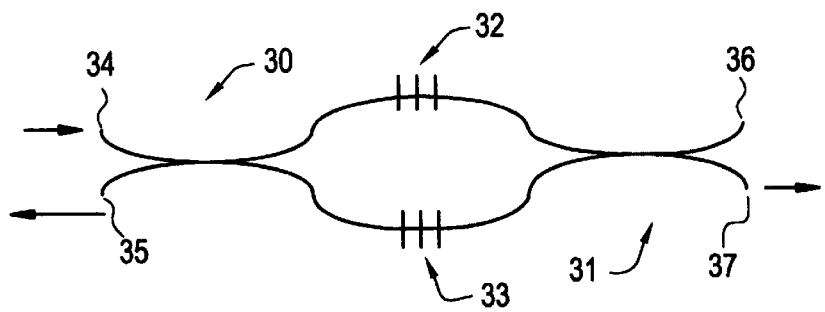
FIG. 2C is a schematic diagram of one of the Mach-Zehnder interferometers used in the components of FIGS. 2A and 2B.

In the multiplexer of FIG. 2B, on the other hand, the four input wavelengths are respectively input through connectors 26–29 and reflected by the respective Bragg gratings of respective Mach-Zehnder interferometers 22–24 to pass through lower wavelength Mach-Zehnder interferometers in a manner similar to that of the demultiplexer, except that inputs to interferometer units 22 and 23 is through port 35 of the interferometer illustrated in FIG. 2C, input to interferometer 24 is through ports 35 and 37, and the outputs are through port 34.

Finally, those skilled in the art will note that the individual interferometer units of the demultiplexer and multiplexer illustrated in FIGS. 2A and 2B are arranged so that the shortest wavelengths are removed first and inserted last. This order is preferred because it eliminates the short wavelength tail effect known to those skilled in the art, as explained in the above-cited copending patent application.

Figure 3B:
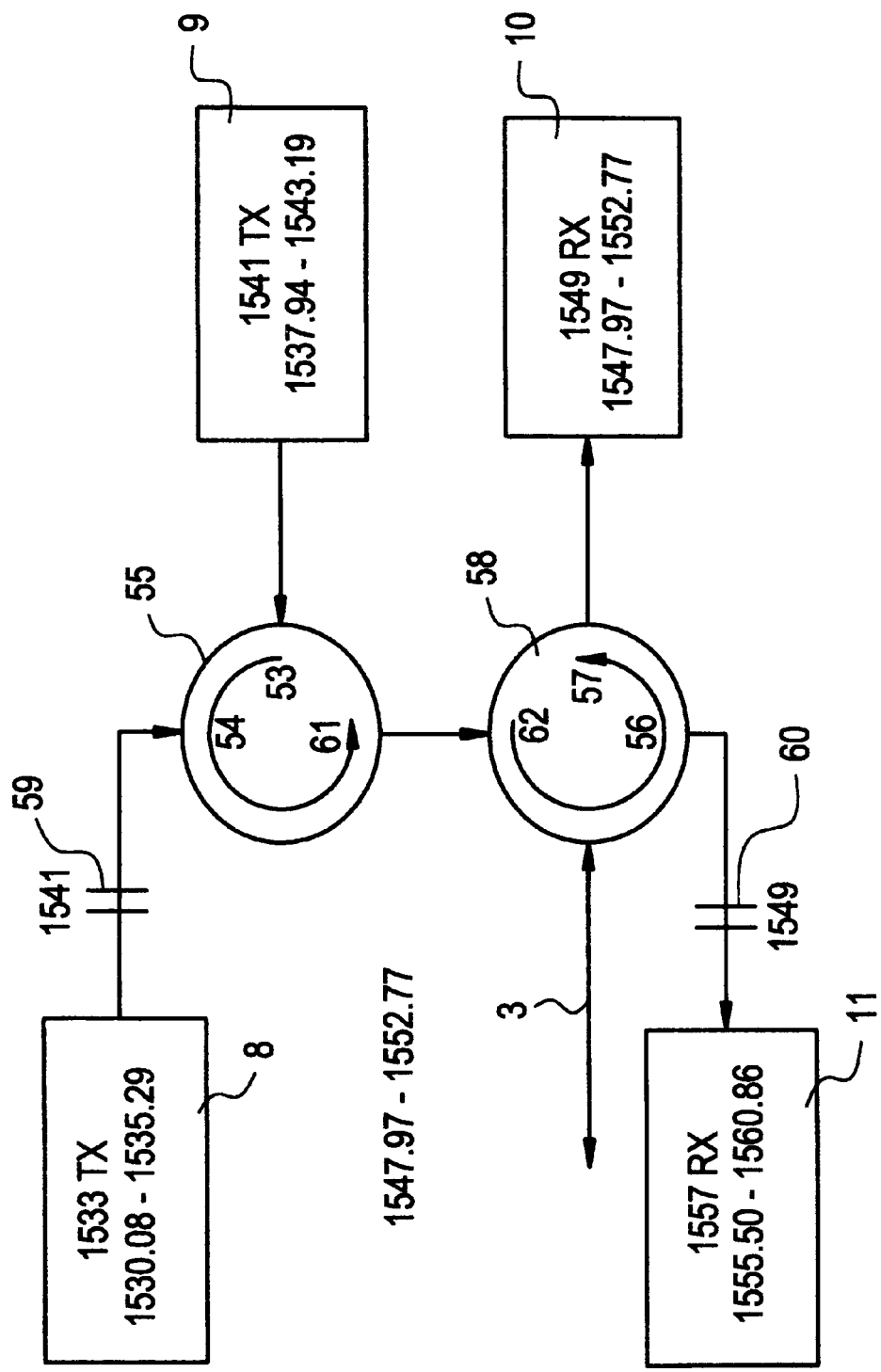
FIG. 3B is a schematic diagram of a second bi-directional combiner suitable for use in the communications system of FIG. 1.
Figure 4:
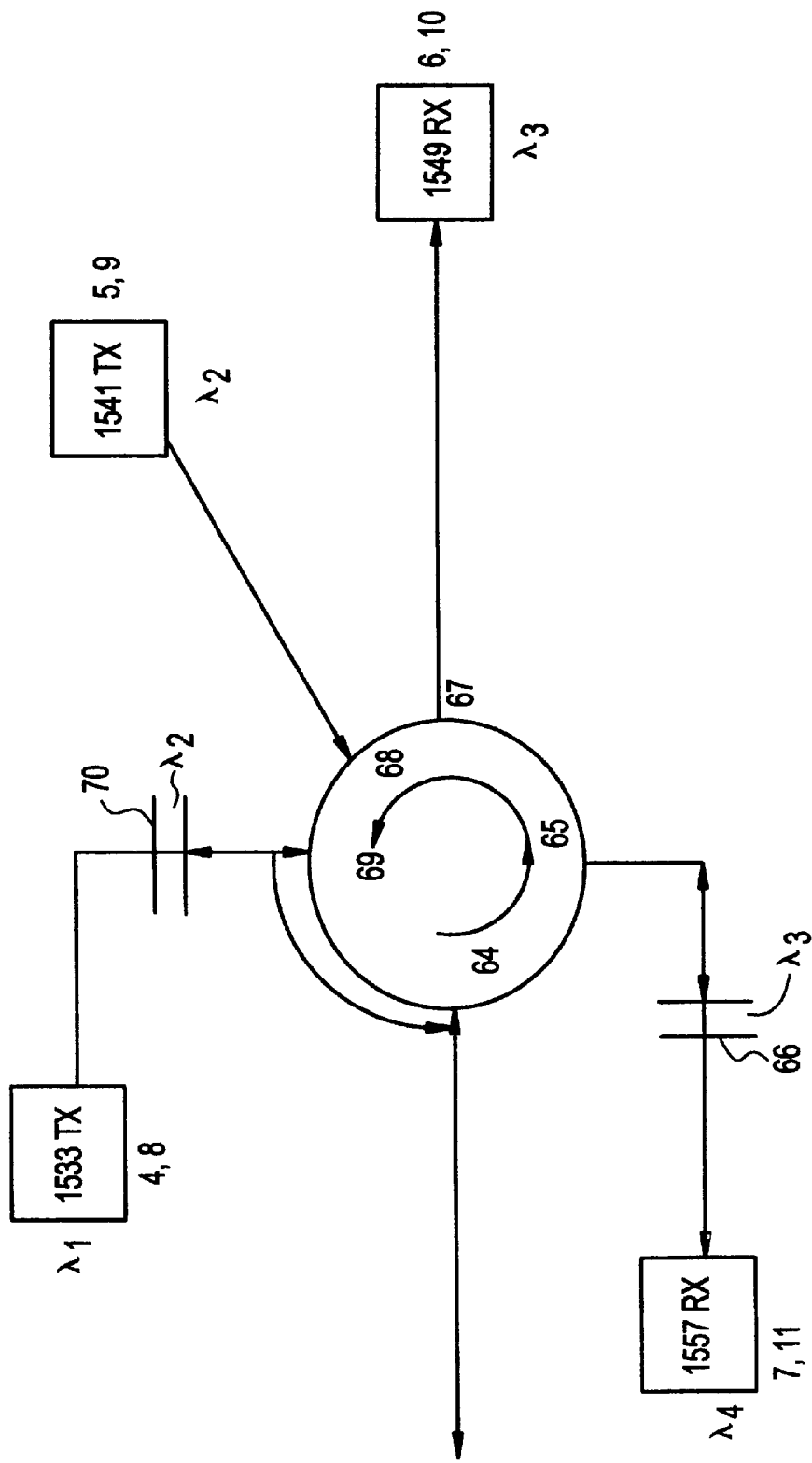
FIG. 4 is a schematic diagram of a variation of the bi-directional combiner of FIG. 3.

The bi-directional combiners are respectively shown in FIGS. 3A and 3B, with a variation of these combiners being shown in FIG. 4. The optical circulators used in each of these variations are conventional and, in addition to the brief description found in above-cited U.S. Pat. No. 5,608,825, are described in the article by Jay S. Delden entitled Optical Circulators Improve Bidirectional Fiber Systems, in *Laser Focus World*, November, 1995, and in numerous prior patents directed to a variety of fiber optic components, such as U.S. Pat. No. 5,608,571, which is directed to an optical amplifier arrangement using optical circulators and Bragg gratings in a manner similar to that described in the U.S. Pat. No. 5,608,825. Unlike the optical circulators described in these references, however, the ports of the optical circulators of the preferred embodiment are used to separate or collect groups of channels, taking advantage of the relative large available passband of these devices.

In the combiner illustrated in FIG. 3A, which corresponds to combiner 1 shown in FIG. 1, two optical circulators 40 and 41 are utilized. One of the optical circulators 40 is a four port device and the other optical circulator 41 is a three port device, with the additional port on optical circulator 40 being connected to the bi-directional transmission fiber 3. For convenience, the cascaded multiplexer components are referred to by the center channel of the group of multiplexed channels output thereby, respectively 1549 and 1557, and by the letters TX, which stands for "transmitter," while the demultiplexers 6 and 7 are referred to by their respective center channels 1533 and 1541, and by the letters RX, which stands for "receiver," but it is to be understood that the respective elements 4–7 shown in this figure are the same as elements 4–7 shown in FIG. 1 and described above.

In this arrangement, the cascaded multiplexers or transmitters 4 and 5 are respectively connected to ports 42 and 43 of circulator 41 and the signals input therethrough are output through port 44 after having circulated in the direction indicated by arrow 45, port 44 being connected to port 46 of optical circulator 40, with port 46 being adjacent to common input/output port 47 connected to the transmission fiber 2 so that the signals input from transmitter 5 pass a single input port and none of the receiver ports before being output to the transmission fiber, and the signals input from transmitter 4 are directly output to the transmission fiber, thereby minimizing losses resulting from reflections at multiple ports. In order to isolate port 43 from signals input through port 42, a Bragg grating 48 is placed between port 43 and the transmitter 4, the Bragg grating being arranged to reflect the entire group of channels input through port 42, i.e., the group designated 1549, while passing the 1557 group output by transmitter 4.

Signals received from the transmission cable 3 also pass through port 47, but are passed directly to receiver ports 49 and 50, respectively connected to receivers 7 and 6, in the direction of arrow 51. Again, losses are minimized by passing one group of channels directly to the corresponding output port, with the second group having to pass only one receiver port before being output, the first receiver 7 being isolated from the second receiver 6 by a Bragg grating 52 which passes the 1541 group of wavelengths but reflects the 1533 group.

It will be appreciated by those skilled in the art that both the transmitter and receiver isolation gratings may be in the form of a single Bragg grating, series of Bragg gratings, or any equivalent filter or coupler arrangement, and in certain types of optical circulators, may even be omitted. In addition, the number of optical circulators and/or the number of ports on each optical circulator can be varied to accommodate different numbers of groups of channels and therefore the number of multiplexer/transmitters and demultiplexer/receivers to which the ports are connected, and additional isolating or filtering elements can be added to any of the ports. The ports are of course preferably connectorized to facilitate connection to the respective multiplexer/demultiplexer components.

The combiner 2 shown in FIG. 3B is identical to combiner 1 shown in FIG. 3A, except that the channel assignments of the transmitter ports 53 and 54 of optical circulator 55 and receiver ports 56 and 57 of optical circulator 58 are interchanged as illustrated, as are the passbands of the Bragg gratings 59 and 60. More specifically, in this combiner, the 1541 group of channels is input through port 53 and the 1533 group of channels is input through port 54, with isolation between the 1533 transmitter 8 and the 1541 transmitter 9 being provided by grating 59, and the combined or multiplexed groups of signals being passed through port 61 on optical circulator 55 and port 62 on optical circulator 58 to the common input/output port 63 for transmission over optical transmission fiber 3. Signals received from the transmission fiber 2 are output through ports 56 and 57, with isolation between the 1557 receiver and the 1549 receiver being provide by Bragg grating 60 in the same manner as in combiner 1.

Advantageously for many applications, the two-circulator bi-directional configuration illustrated in FIGS. 3A and 3B can be varied by using a single five port circulator 61, illustrated generally in FIG. 4. This configuration also requires only two isolating gratings or similar structures with the two groups of channels received from transmission fiber 2 being input through common input/output port 64, with one of the groups λ4 passing through port 65 and grating 66 to be received by receivers 7 or 11 and the other group λ3 being reflected by grating 66 and output through port 67 to be received by receivers 6 or 10. In this configuration, the transmitters are connected to ports 68 and 69 such that a first group of channels λ2 is input by transmitters 5 or 9 through port 68 and reflected by grating 70 to be output through common input/output port 64, while the second group of channels λ1 is input by transmitters 4 or 8 through grating 70 and port 69 for output through common input/output port 64.

Figure 5:
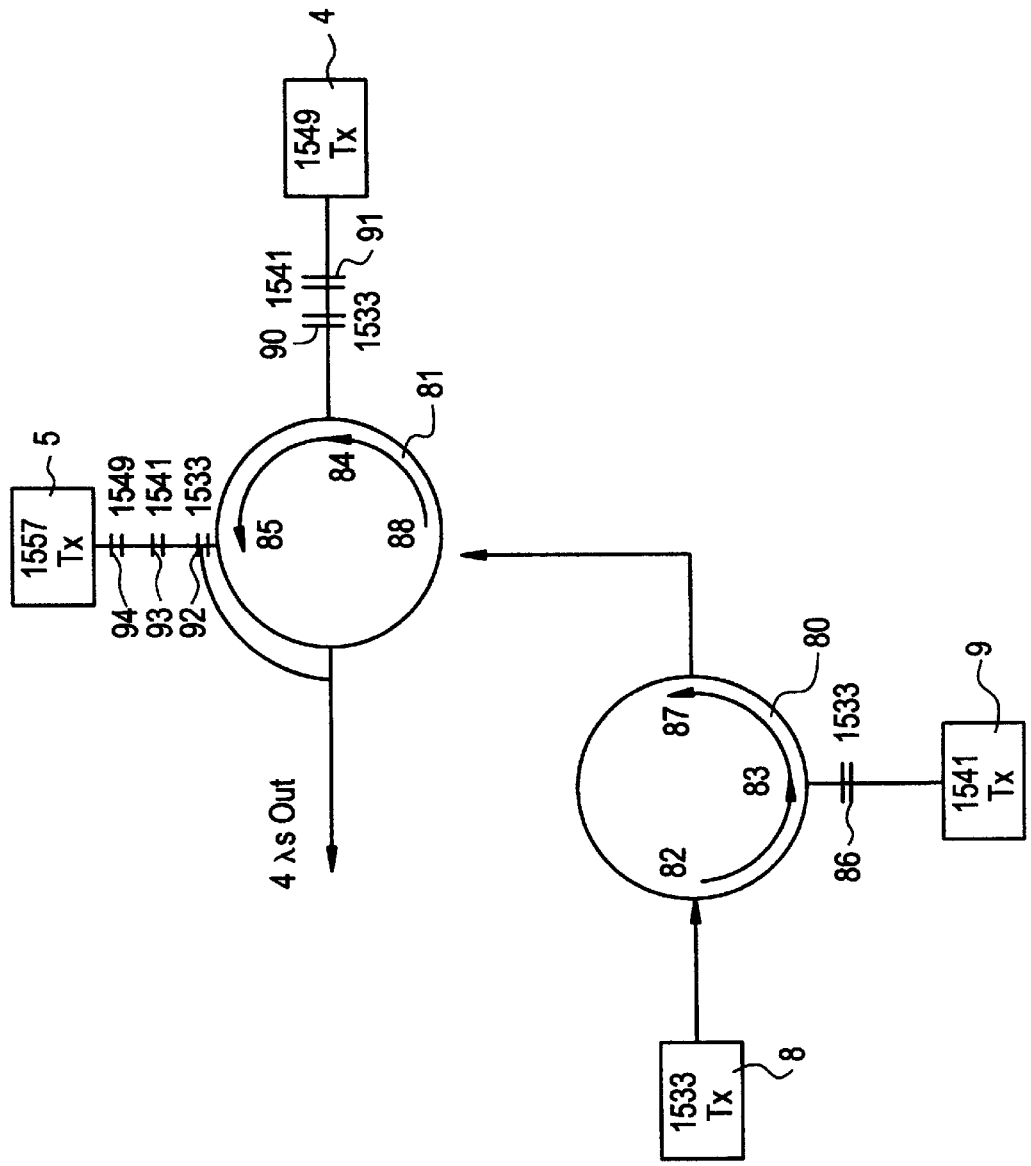
FIG. 5 is a schematic diagram of a uni-directional combiner constructed according to the principles of a second preferred embodiment of the invention.
Figure 6:
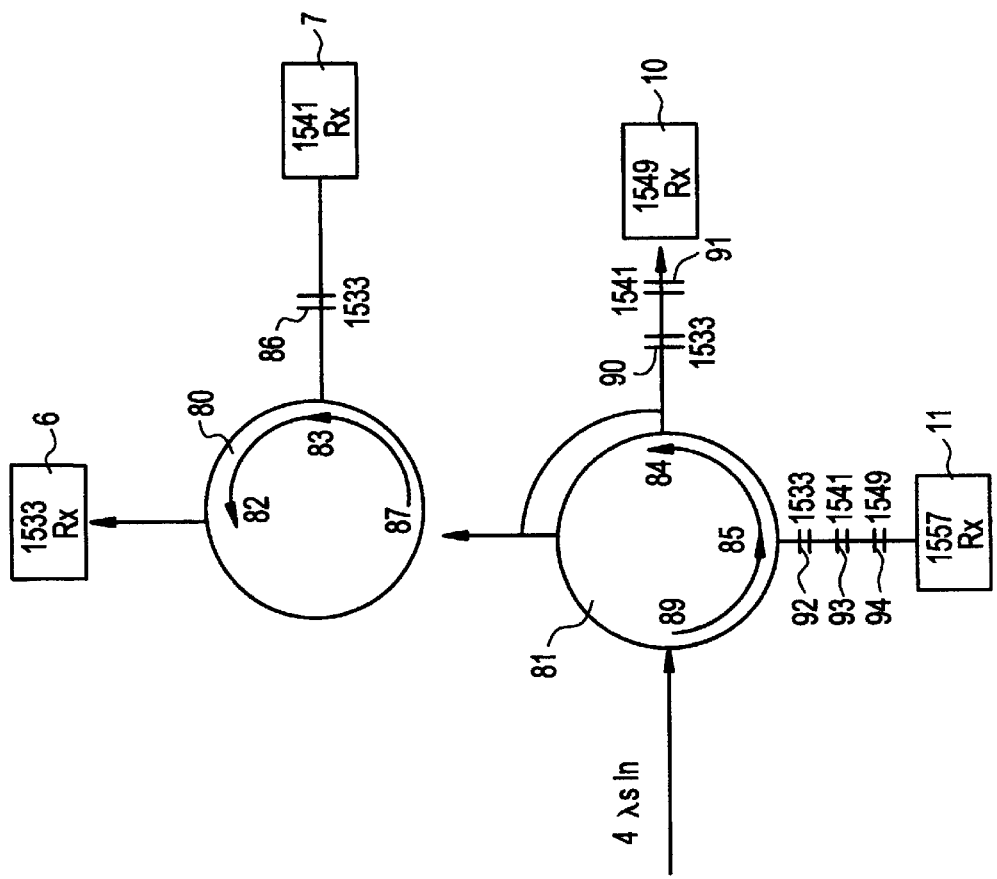
FIG. 6 is a schematic diagram of a second uni-directional combiner constructed according to the principles of the second preferred embodiment.

In addition to the bi-directional system configuration illustrated in FIG. 1, it is possible to provide a uni-directional system in which, for example, demultiplexers 6 and 7 are interchanged with multiplexers 8 and 9, and the combiners are modified accordingly to provide unidirectional operation as shown in FIGS. 5 and 6. In this embodiment, the unidirectional multiplexer arrangement for the individual transmitters corresponding to transmitters 4–7 of the first preferred embodiment are made up of optical circulators 80 and 81 having respective input ports 82–85, with the first group of signals λ1 being input through port 82 and the second group of signals λ2 being input through port 83 and a Bragg grating 86 which passes λ2 but reflects λ1. The combined signal including groups λ1 and λ2 is output from the first circulator 80 through port 87 and input to the second circulator 81 through port 88, and passed to common output port 89 via ports 84 and 85 and isolating gratings 90–93, with one grating for each of the respective groups being required for isolation purposes at each of the ports in order to pass the groups to the common output port with minimal loss. The third group of channels λ3 is input through port 84 and reflected by an additional Bragg grating 94 connected between port 85 and the group λ4 transmitter for output through common output port 89, while the fourth channel group λ4 is input through each of gratings 92–94 and port 85 for output by the common output port 89.

Those skilled in the art will appreciate that the serially arranged gratings at ports 83–85 could be replaced by other types of channel isolators so long as the appropriate wavelengths are allowed to pass through to the common output port, and two circulator arrangement could be replaced by a single circulator arrangement in which the circulator has five ports, in a manner analogous to the variation illustrated in FIG. 4, and further that both the number of channels and/or the number of circulators may be varied to accommodate different number of channels.

Finally, the uni-directional demultiplexing combiner (which may more accurately be described as a separator or distributor rather than a "combiner") is identical to the uni-directional multiplexing combiner, except that the respective transmitters and receivers are interchanged, and the common output port serves instead as a common input port. Because the construction of the demultiplexing combiner of FIG. 6 may be identical to the construction of the multiplexing connector of FIG. 5, the various elements shown in FIG. 6 have been numbered the same as corresponding elements illustrated in FIG. 5, with the direction of the arrows indicating the directivity of the circulators being reversed.

Having thus described various preferred embodiments of the invention, those skilled in the art will appreciate that variations and modifications of the preferred embodiment may be made without departing from the scope of the invention. For example, as indicated above, the number of channels provided for in the basic components may be freely varied depending on system requirements, as may be the wavelengths of the channels carried, and any of the illustrated gratings may be replaced by other types of gratings, filters, or the like, and in some types of circulators, isolation may even be provided by elements internal to the circulators or by the nature of the ports. Furthermore, those skilled in the art will appreciate that additional gratings or filters may be added anywhere in the system to increase isolation and/or reduce losses, and that the multiplexers, demultiplexers, and/or combiners of the invention may be separately housed, housed together, or integrated with other optical components.

It is accordingly intended that the invention not be limited by the above description or accompanying drawings, but that it be defined solely in accordance with the appended claims.

I claim:

1. In a multiple channel communications system including an optical fiber transmission line and at least two cascaded wavelength division multiplexing components at each end of the transmission line, the improvement wherein said at least two wavelength division multiplexing components at each end of the transmission line is coupled to the transmission line via combiners, at least one of said combiners at one end of the transmission line being arranged to multiplex groups of signals from said cascaded wavelength division multiplexing components, each said group forming a different set of channels, and at least one of said combiners at said second end of the transmission line being arranged to demultiplex said groups of different wavelength signals received over the transmission line from said cascaded wavelength division multiplexing components and distribute the demultiplexed groups to at least two of the cascaded wavelength division multiplexing components at said second end of the transmission line, wherein said combiners are bi-directional combiners, and at least one of said multiplexing components at each end of the transmission line is a cascaded multiple channel multiplexer, and at least one of said multiplexing components at each end of the transmission line is a cascaded multiple channel demultiplexer.

wherein said cascaded multiple channel multiplexer comprises:

a plurality of Mach-Zehnder interferometer units, each unit comprising a pair of 50/50 fiber optic couplers connected by a pair of Bragg gratings and three functional ports including two multi-channel input/output ports, and one single channel input port, said Bragg gratings being tuned to a wavelength of the single channel input port;

means for connecting a plurality of transmitters respectively to said single channel input ports;

means for connecting input/output ports of adjacent said interferometer units in a cascade configuration; and a common output port on a last of said cascaded interferometer units, said common output port of each multiplexer being connected to a different input port of one of the combiners.

2. A system as claimed in claim 1, wherein said wavelength division multiplexing components are dense wavelength division multiplexing (DWDM) components.

3. In a multiple channel communications system including an optical fiber transmission line and at least two cascaded wavelength division multiplexing components at each end of the transmission line, the improvement wherein said at least two wavelength division multiplexing components at each end of the transmission line is coupled to the transmission line via combiners, at least one of said combiners at one end of the transmission line being arranged to multiplex groups of signals from said cascaded wavelength division multiplexing components, each said group forming a different set of channels, and at least one of said combiners at said second end of the transmission line being arranged to demultiplex said groups of different wavelength signals received over the transmission line from said cascaded wavelength division multiplexing components and distribute the demultiplexed groups to at least two of the cascaded wavelength division multiplexing components at said second end of the transmission line, wherein said combiners are bi-directional combiners, and at least one of said multiplexing components at each end of the transmission line is a cascaded multiple channel multiplexer, and at least one of said multiplexing components at each end of the transmission line is a cascaded multiple channel demultiplexer, and wherein said cascaded multiple channel demultiplexer comprises:

a plurality of Mach-Zehnder interferometer units, each unit comprising a pair of 50/50 fiber optic couplers connected by a pair of Bragg gratings and three functional ports including two multi-channel input/output ports, and one single channel output port, said Bragg gratings being tuned to a wavelength of the single channel output port;

means for connecting a plurality of transmitters respectively to said single channel output ports;

means for connecting input/output ports of adjacent said interferometer units in a cascade configuration; and a common input port on a first of said cascaded interferometer units, said common input port of each multiplexer being connected to a different output port of one of the combiners.

4. A system as claimed in claim 1, wherein a number of said demultiplexers multiplexers is at least two, wherein said one of said combiners comprises at least one multiple port optical circulator, said multiple port optical circulator having at least three ports, two of which are connected to different ones of said multiplexers, and a third of which serves as a common output to said transmission line.

5. A system as claimed in claim 4, wherein a number of said demultiplexers is at least two, and wherein said one of said combiners comprises a second multiple port optical circulator, said first multiple port optical circulator having at least four ports, the fourth being connected to one of at least three ports on the second multiple port optical circulator, a remaining two of said at least three ports of the second multiple port optical circulator being connected to said demultiplexers.

6. A system as claimed in claim 5, wherein said at least two demultiplexers are is isolated by at least one Bragg grating connected between one of said demultiplexers and a port of the optical circulator to which the one of said demultiplexers is connected, and wherein said at least two multiplexers are isolated by at least one Bragg grating connected between one of said multiplexers and a port of the optical circulator to which the one of said multiplexers is connected, said Bragg gratings being arranged to reflect one of said sets of channels in order to permit said channels to be passed on to a subsequent port without significant losses.

7. A system as claimed in claim 1, wherein a number of said multiplexers is at least two, and wherein said one of said combiners comprises at least one multiple port optical circulator, said multiple port optical circulator having at least three ports, two of which are connected to different ones of said multiplexers, and a third of which serves as a common output, and wherein said at least two multiplexers are isolated from each other by at least one Bragg grating connected between one of said multiplexers and a port of the optical circulator to which the one of said multiplexers is connected, said Bragg grating being arranged to reflect one of said sets of channels in order to permit said channels to be passed on to a subsequent port without significant losses.

8. A system as claimed in claim 1, wherein a number of said multiplexers is at least two and a number of said demultiplexers is at least two, and wherein said at least one combiner comprises a single multiple port optical circulator having a common input/output port, at least one input port for each of said multiplexers, and a common output port for each of said demultiplexers, two of said multiplexers being isolated from each other by a Bragg grating connected between one of said multiplexers and a corresponding input port, and two of said demultiplexers being isolated from each other by a Bragg grating connected between one of said demultiplexers and a corresponding output port.

9. A system as claimed in claim 1, wherein said combiners are uni-directional combiners, and at least two of said multiplexing components at said one end of the transmission line are cascaded multiple channel multiplexers, and at least two of said multiplexing components at said second end of the transmission line is a cascaded multiple channel demultiplexer.

10. A system as claimed in claim 9, wherein each said cascaded multiple channel demultiplexer comprises:

a plurality of Mach-Zehnder interferometer units, each unit comprising a pair of 50/50 fiber optic couplers connected by a pair of Bragg gratings and three functional ports including two multi-channel input/output ports, and one single channel output port, said Bragg gratings being tuned to a wavelength of the single channel output port;

means for connecting a plurality of transmitters respectively to said single channel output ports;

means for connecting input/output ports of adjacent said interferometer units in a cascade configuration; and a common input port on a first of said cascaded interferometer units, said common input port of each multiplexer being connected to a different output port of one of the combiners.

11. A system as claimed in claim 9, wherein a number of said demultiplexers is at least two, and wherein one of said combiners comprises at least one multiple port optical circulator, said multiple port optical circulator having at least three ports, two of which are connected to different ones of said demultiplexers, and a third of which serves as a common output to said transmission line.

12. A system as claimed in claim 11, wherein a number of said demultiplexers is at least four, and wherein said one of said combiners comprises a second multiple port optical circulator, said first multiple port optical circulator having at least four ports, the fourth being connected to one of at least three ports on the second multiple port optical circulator, a remaining two of said at least three ports of the second multiple port optical circulator being connected to said demultiplexers.

13. A system as claimed in claim 12, wherein said at least four multiplexers are isolated by at least one Bragg grating connected between each of the remaining ones of said multiplexers, situated in a direction of circulation of said optical circulators between the multiplexer to be isolated and the output port of said combiner, and a corresponding input port, such that a first output port situated adjacent the common output port has at least three Bragg gratings connected thereto, a second output port situated adjacent the first output port has at least two Bragg gratings connected thereto, and so forth, each of said Bragg gratings being arranged to reflect one said sets of channels.

14. A system as claimed in claim 9, wherein a number of said multiplexers is at least two, and wherein one of said combiners comprises at least one multiple port optical circulator, said multiple port optical circulator having at least three ports, two of which are connected to different ones of said multiplexers, and a third of which serves as a common output to said transmission line.

15. A system as claimed in claim 14, wherein a number of said multiplexers is at least four, and wherein said one of said combiners comprises a second multiple port optical circulator, said first multiple port optical circulator having at least four ports, the fourth being connected to one of at least three ports on the second multiple port optical circulator, a remaining two of said at least three ports of the second multiple port optical circulator being connected to said multiplexers.

16. A system as claimed in claim 15, wherein said at least four multiplexers are isolated by at least one Bragg grating connected between each of the remaining ones of said multiplexers, situated in a direction of circulation of said optical circulators between the multiplexer to be isolated and the output port of said combiner, and a corresponding input port, such that a first output port situated adjacent the common output port has at least three Bragg gratings connected thereto, a second output port situated adjacent the first output port has at least two Bragg gratings connected thereto, and so forth, each of said Bragg gratings being arranged to reflect one said sets of channels.

17. A system as claimed in claim 9, wherein a number of said multiplexers is at least four and a number of said demultiplexers is at least four, and one of said combiners comprises a single optical circulator having a common input/output port and at least one input port for each of said multiplexers, and wherein a second of said combiners comprises a single optical circulator having a common output port for each of said demultiplexers.

18. A system as claimed in claim 17, wherein said at least four multiplexers are isolated by at least one Bragg grating connected between each of the remaining ones of said multiplexers, situated in a direction of circulation of said optical circulators between the multiplexer to be isolated and the output port of said combiner, and a corresponding input port, such that a first output port situated adjacent the common output port has at least three Bragg gratings connected thereto, a second output port situated adjacent the first output port has at least two Bragg gratings connected thereto, and so forth, each of said Bragg gratings being arranged to reflect one said sets of channels.

19. A system as claimed in claim 17, wherein said at least four demultiplexers are isolated by at least one Bragg grating connected between each of the remaining ones of said demultiplexers, situated in a direction of circulation of said optical circulators between the demultiplexer to be isolated and the output port of said combiner, and a corresponding input port, such that a first output port situated adjacent the common output port has at least three Bragg gratings connected thereto, a second output port situated adjacent the first output port has at least two Bragg gratings connected thereto, and so forth, each of said Bragg gratings being arranged to reflect one said sets of channels.

* * * * *